United States Patent
Domel et al.

(10) Patent No.: US 8,403,271 B2
(45) Date of Patent: Mar. 26, 2013

(54) PASSIVE ROBUST FLOW CONTROL MICRO DEVICE

(75) Inventors: Neal D. Domel, Fort Worth, TX (US); Dan J. Baruzzini, Keller, TX (US); Daniel N. Miller, Bainbridge Island, WA (US)

(73) Assignee: Lockheed Martin Corporation, Bethesda, MD (US)

( * ) Notice: Subject to any disclaimer, the term of this patent is extended or adjusted under 35 U.S.C. 154(b) by 403 days.

(21) Appl. No.: 12/862,436

(22) Filed: Aug. 24, 2010

(65) Prior Publication Data

US 2012/0049008 A1 Mar. 1, 2012

(51) Int. Cl.
*B64C 21/00* (2006.01)

(52) U.S. Cl. ............... 244/200; 244/198; 244/200.1

(58) Field of Classification Search .......... 244/130, 244/35 A, 200, 200.1, 199.1, 198
See application file for complete search history.

(56) References Cited

U.S. PATENT DOCUMENTS

| | | |
|---|---|---|
| 2,800,291 A | 7/1957 | Stephens |
| 5,058,837 A | 10/1991 | Wheeler |
| 5,114,099 A | 5/1992 | Gao |
| 5,598,990 A | 2/1997 | Farokhi et al. |
| D432,073 S | 10/2000 | Coyle |
| 6,570,333 B1 | 5/2003 | Miller et al. |
| 6,796,532 B2 | 9/2004 | Malmuth et al. |
| 6,805,325 B1 | 10/2004 | Malmuth et al. |
| 7,017,863 B2 | 3/2006 | Scott et al. |
| 7,066,431 B2 | 6/2006 | Scott et al. |
| 7,380,756 B1 | 6/2008 | Enloe et al. |
| 7,624,941 B1 | 12/2009 | Patel et al. |
| 2008/0023589 A1 | 1/2008 | Miles et al. |
| 2009/0109115 A1 | 4/2009 | Dittrich et al. |
| 2009/0173837 A1 | 7/2009 | Silkey et al. |
| 2009/0212164 A1 | 8/2009 | Osborne et al. |

FOREIGN PATENT DOCUMENTS

WO 0015961 3/2000

*Primary Examiner* — Timothy D Collins
*Assistant Examiner* — Jamie S Stehle
(74) *Attorney, Agent, or Firm* — Bracewell & Giuliani LLP

(57) ABSTRACT

A tapered micro-plow, or a series of tapered micro-plows, are submerged in a boundary layer just upstream of a reflection point of an oblique shock. Each micro-plow develops a beneficial pair of vortices which redistribute high energy flow within the boundary layer such that flow separation is prevented or delayed. The beneficial vortex pairs rotate about an axis that is parallel to the flow of fluid, and together rotate such that they induce a velocity on one another which tends to hold them near the surface and delay vortex lift-off.

20 Claims, 7 Drawing Sheets

PASSIVE ROBUST FLOW CONTROL MICRO DEVICE

BACKGROUND

1. Technical Field:

This disclosure relates in general to passive flow control device and in particular to a passive device for delaying boundary layer flow separation within a high velocity fluid.

2. Description of Related Art:

All jet aircraft require a propulsion system which diffuses the incoming air to certain speeds before passing it through the jet engine. For supersonic aircraft, this process often involves a mixed compression inlet which initiates a series of shock waves that reflect off of the inlet surfaces. Each shock reflection causes a shock-boundary layer interaction near the point of reflection. Each interaction may include a shock-induced separation which reduces the inlet pressure recovery and degrades performance. The separation may also cause blockage, thereby reducing the effective flowpath area to a value below the critical level required for operation. This leads to an unstart, and limits the operational range of the inlet.

Shock induced separation can be reduced by actively bleeding (removing) the boundary layer from the flowfield, which requires porous surfaces and tubes/plumbing beneath the surface. The complexity and weight associated with porous surfaces and tubes/plumbing can degrade mission performance of the jet aircraft.

Vane-type vortex generators submerged in the boundary layer (i.e., micro-vanes) can modify fluid flow, but the contact surface of the micro-vanes is so small that they have a high likelihood of detaching and creating a foreign object damage ("FOD") hazard. Ramp-type vortex generators submerged in the boundary layer (i.e., micro-ramps) can be attached more securely than micro-vanes, but their aerodynamic performance is worse than that of micro-vanes. Indeed, many studies show them to be worse than nothing at all because they introduce shock waves with an orientation which further reduces pressure recovery. Also, each micro-ramp creates a vortex pair in a position and orientation such that they induce an upward velocity (upwash) on one another which elevates them off of the surface (i.e., vortex lift-off). This upward velocity away from the surface diminishes their effectiveness at redistributing the boundary layer energy toward the floor.

SUMMARY OF THE INVENTION

A passive device, called a "tapered micro-plow," can modify boundary layer flow over a surface by generating pairs of vortices that can keep can the boundary layer flow attached to the surface. Indeed, vortices generated by the tapered micro-plow can redistribute high energy flow within the boundary layer such that the separation is prevented or delayed.

In one embodiment, one or more tapered micro-plows can be affixed to the inlet surface of a mixed compression engine inlet, just upstream of a shock reflection point, such that it is submerged in the attached boundary layer adjacent to the surface. Each tapered micro-plow can generate a vortex pair which minimizes the adverse effects of upwash and shock losses which impede the performance of conventional high speed vortex generators. Other potential applications can include, but are not limited to, supersonic boundary layer control on external wings.

Tapered micro-plows can have a large contact area with the surface. This allows them to be securely fixed to the surface, and can enhance their resistance to breakage, thermal erosion, and ablation. Therefore, tapered micro-plows can reduce any foreign object damage hazard normally associated with fragile micro-vanes.

The tapered micro-plows can also reduce shock losses. The leading edge shocks emanate primarily outward into the boundary layer, rather than up into the supersonic core flow. The divergence angle can begin with a low value such that the shock is weak and attached, thereby reducing shock losses. The divergence angle increases in segments moving aft such that the local angle is effective at producing voracity. The height distribution can create a "nose-cone" effect which also reduces the shock losses.

The tapered micro-plows can generate vortices which beneficially delay vortex lift-off. The created vortex pair can exit the micro-device near the floor, and the direction of rotation can induce favorable downwash, which can hold the vortices down where they are most effective.

DETAILED DESCRIPTION

Although the following detailed description contains many specific details for purposes of illustration, one of ordinary skill in the art will appreciate that many variations and alterations to the following details are within the scope and spirit of the invention. Accordingly, any exemplary embodiments of the invention described herein are set forth without any loss of generality to, and without imposing limitations thereon, the present invention.

Figure 1:
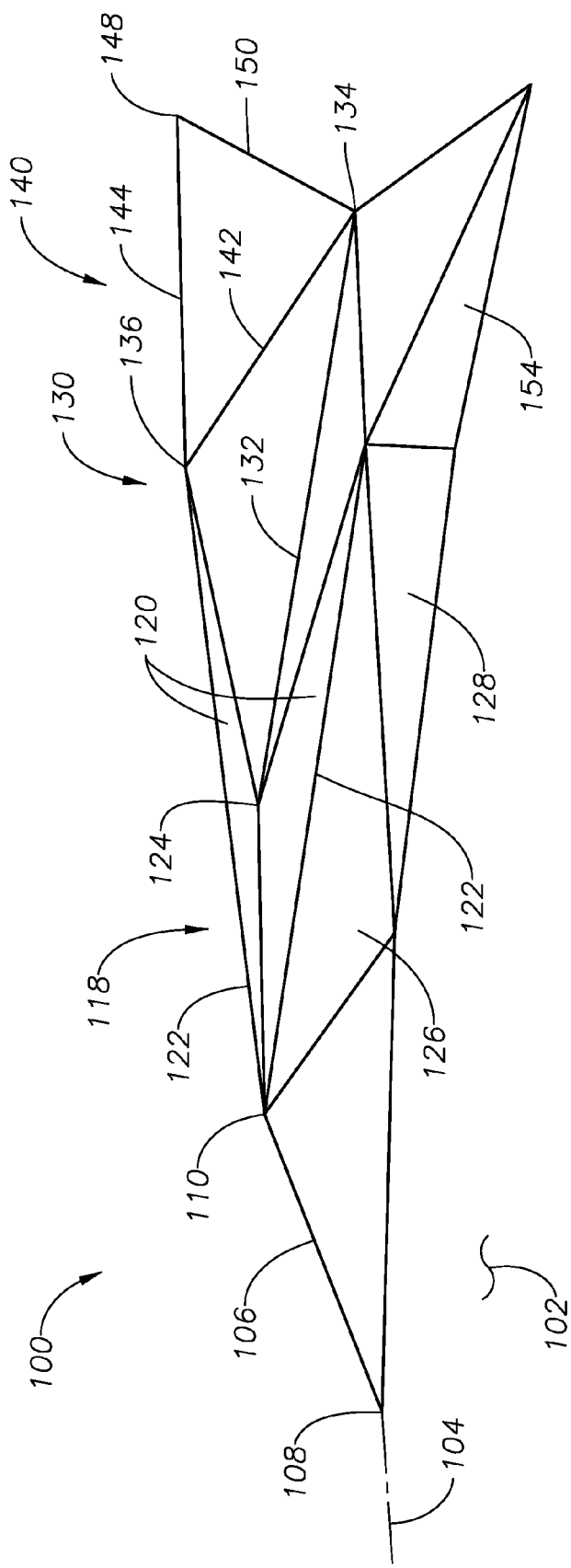
FIG. 1 is a perspective diagrammatic view of an exemplary embodiment of a micro-plow passive flow control device.
Figure 2:
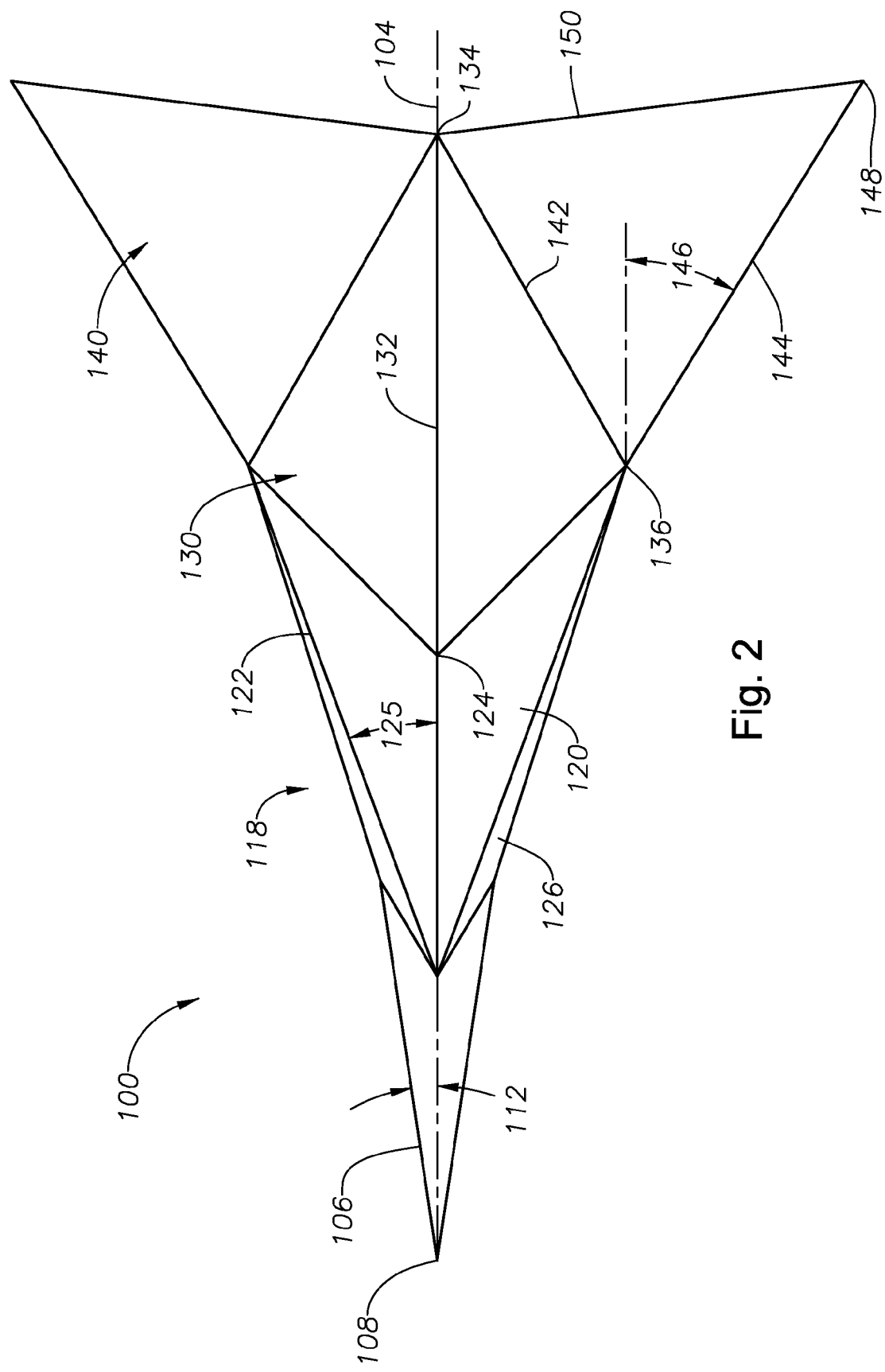
FIG. 2 is a top view of the micro-plow passive flow control device of FIG. 1.
Figure 3:
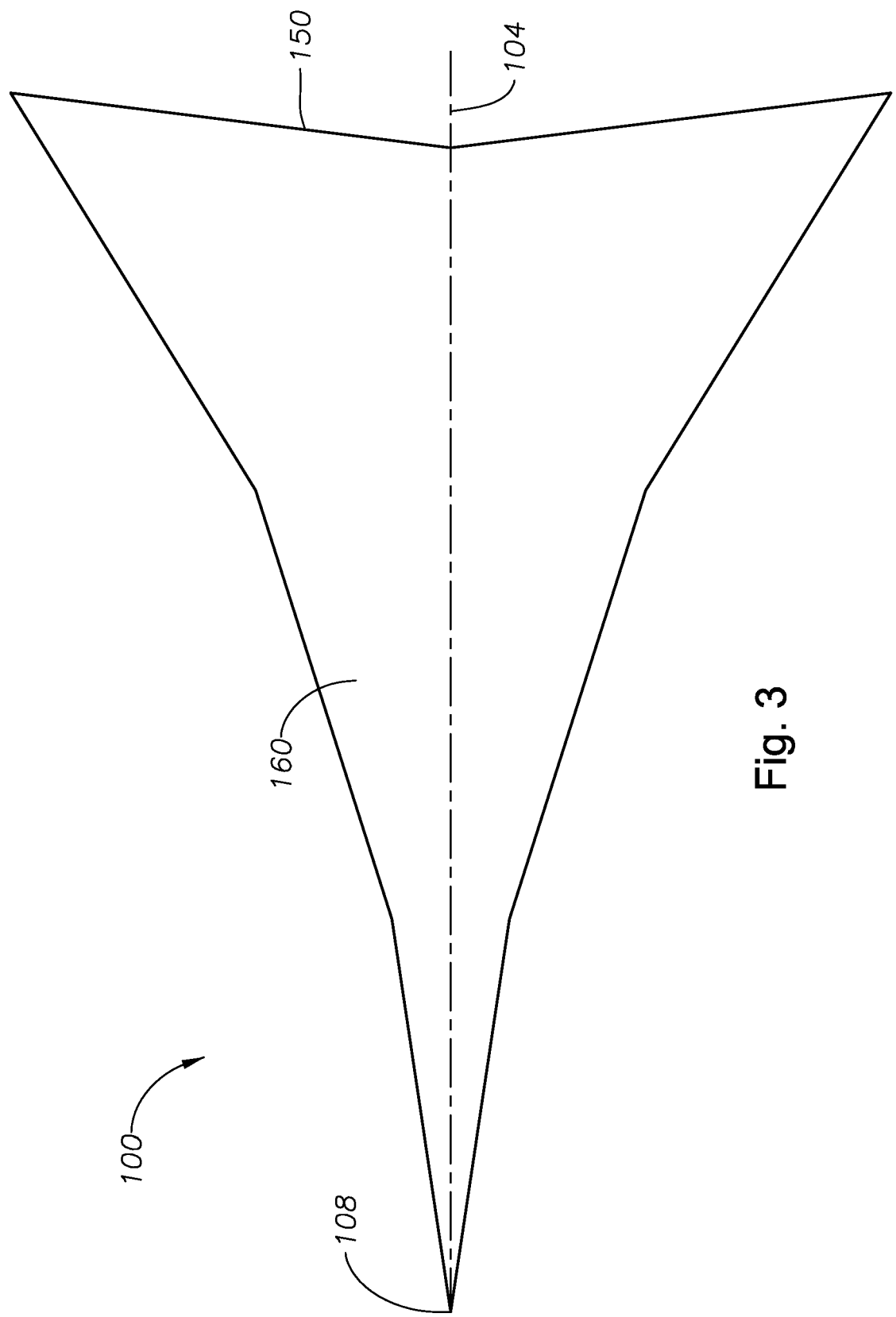
FIG. 3 is a bottom view of the micro-plow passive flow control device of FIG. 1.

Referring to FIGS. 1-3, micro-plow 100 is a passive device for altering fluid flow over surface 102. Surface 102 could be, for example, a wing surface on an aircraft, a surface on a jet-engine air inlet, a surface on the hull of a ship, a surface on a propeller of a ship, or any other surface in which fluid is moving across the surface. As will be described, below, micro-plow 100 is a tapered micro-plow. Micro-plow 100 has a centerline 104, or axis, that can be parallel to the direction of the flow of fluid over surface 102. Nose 106 is located at the upstream end of micro-plow 100. Nose has a point 108 that is centered on centerline 104 and extends away from surface 102, at an apex angle, to apex 110. The apex angle is the angle at which nose 106 rises from surface 102. In one embodiment, apex 110 is the part of micro-plow 100 that is located furthest, vertically, from surface 102. The sides of nose 106 diverge, laterally, from centerline 104 at nose angle 112.

Glove 118 is located aft of apex 110. Glove 118 can include a number of triangular facets. In one embodiment, glove 118 includes six triangular facets. The six facets can include three pair, identified as 120, 126 and 128. Centerline 104 can divide each pair symmetrically such that each facet is a mirror image of the other in the pair. Each triangular glove facet 120 is an oblique triangle with its longest edge coinciding with outer edge 122 of micro-plow 100. Both triangles 120 share a common edge along centerline 104 with endpoints located at apex 110 and point 124. Outer edges 122 of glove 118 diverge from centerline 104 at glove angle 125 and can define the top edge of glove sidewall 126. Triangular glove facets 128 can define part of the glove sidewall, and each can have one edge on the floor, in contact with or adjacent to surface 102.

Glove angle 125 can be generally greater than nose angle 112. Triangular facets 120 define the upper surface of glove 118, and can gradually slope downward as they move laterally away from centerline 104, or they can be generally in the same plane. Similarly, the surfaces of triangles 120 can each slope downward as they move aft from apex 110, or they can be generally level with apex 110. Glove sidewalls 126 can rise vertically from surface 102 to outer edges 122 or they can rise at an angle. Glove sidewall 128 can be a sidewall that is generally in the same plane as glove sidewall 126 or it can be at an angle to glove sidewall 126.

Dorsal channel 130 is a depression that is concave from the top of micro-plow 100. Dorsal channel 130 begins at point 124 between the legs of glove 118 and slopes downward and aftward from that point. When viewed from above, dorsal channel 130 has a diamond shape that is bisected by dorsal centerline 132, which can be parallel to centerline 104. Laterally, dorsal channel 130 slopes downward as it moves from the outer edges of micro-plow 100 toward dorsal centerline 132. Axially, dorsal channel 130 slopes downward as it transitions aftward, to aft closure point 134 of the diamond shape. Aft closure point 134 is along centerline 104 and adjacent to surface 102. Outer points 136 of dorsal channel 130 are located at the trailing edge of outer edge 122 of glove 118.

Main plows 140 can be a pair of triangularly shaped surfaces located generally aft of outer points 136. The top surface of each main plow 140 can slope downward from fore to aft. In one embodiment, such downward slope of main plow 140 is greater than the downward slope of dorsal channel 130. The foremost point of main plow 140 is located at outer point 136. From outer point 136, inner leg 142 of each main plow slopes downward, from fore to aft, and inward toward centerline 104, to aft closure point 134. Outer leg 144 of each main plow 140 slopes outward, at plow angle 146, to aft tip 148. Plow angle 146 can be greater than glove angle 125. Trailing edge 150 is the aft-most edge of main plow 140, and can extend along surface 102 from aft closure point 134 to aft tip 148. Aft tip 148 can be axially located aft of aft closure point 134. In one embodiment, aft tip 148 is the point of micro-plow 100 located furthest, laterally, from centerline 104 and furthest, axially, from point 108 of nose 106. The top surface of plow 140 can be generally flat or it can be slightly concave or convex.

Each main plow 140 can have a plow segment sidewall 154 rising from surface 102 to outer leg 144. Sidewall 154 can be generally perpendicular to surface 102 or it can extend from surface 102 at an angle. The foremost edge of plow segment sidewall 154 meets the trailing edge of body sidewall 128.

Referring to FIG. 3, bottom surface 160 can be used to affix micro-plow 100 to surface 102 (FIG. 1). Bottom surface 160 can be generally flat, or it can have a contour. In one embodiment, the contour of bottom surface 160 is selected based on the contour of the surface 102 to which micro-plow 100 will be affixed. Indeed, the contour of bottom surface 160 can generally match the contour of surface 102 (FIG. 1) to maximize the surface area in contact between bottom surface 160 and micro-plow 100.

Referring to FIGS. 1 and 3, in one embodiment, the surface area of bottom surface 160 is greater than the combined surface area of glove sidewalls 126, body sidewalls 128, plow segment sidewalls 154, and the sidewalls of nose segment 106. This large surface area, relative to the sidewall surface area, can provide a stronger attachment between micro-plow 100 and surface 102.

Micro-plow 100 can be affixed to surface 102 by a variety of techniques. It can, for example, be affixed by an adhesive, such as an epoxy, it can be welded, or it can be attached by mechanical fasteners, such as screws (not shown) that pass up through surface 102. Bottom surface 160 can have a generally smooth surface, or it can have a texture to increase the strength of the adhesion to surface 102. In one embodiment, micro-plow 100 is formed into surface 102, wherein micro-plow 100 and surface 102 are in integral material. In this embodiment, it can be formed by, for example, being stamped or molded directly into surface 102.

Figure 4:
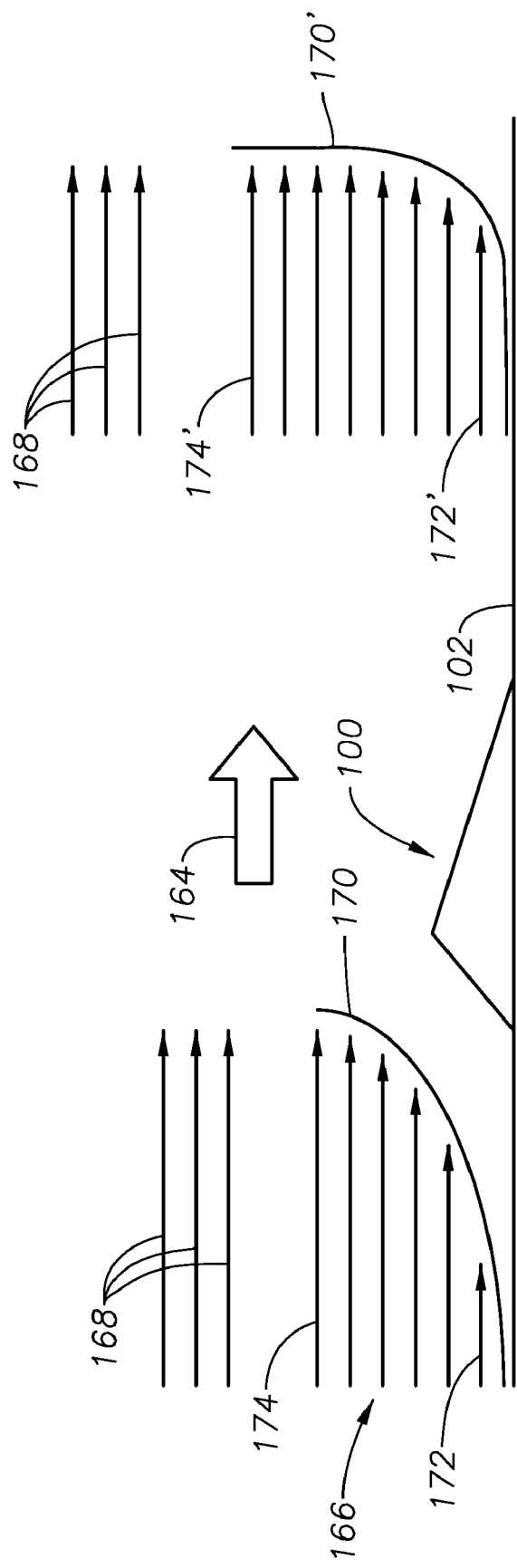
FIG. 4 is a schematic view of fluid flow profiles before and after flowing across the micro-plow passive flow control device of FIG. 1.

Referring to FIG. 4, when fluid 164 flows over surface 102, micro plow 100 can alter the fluid flow. Fluid 164 can be, for example, air or water. In one embodiment, surface 102 can be a surface on an aircraft such as, for example, a wing or a surface within an engine air inlet duct. Alternatively, surface 102 can be a surface on a water craft or a ground vehicle. Surface 102 can move through fluid 164, or fluid 164 can move across surface 102. For the sake of simplicity, any relative movement between fluid 164 and surface 102 will be described as fluid 164 moving across surface 102, regardless of whether surface 102 is moving through static fluid 164, fluid 164 is moving across a static surface 102, or some combination thereof.

Fluid 164 can include boundary layer fluid 166. Boundary layer fluid is fluid that can have reduced velocity as a result of contact with surface 102. Free stream fluid 168 is fluid that is not affected by surface 102. Free stream fluid 168 can be, for example, supersonic core flow within an inlet of an aircraft. In one embodiment, the height of micro-plow 100, measured at apex 110, is approximately ⅓ the height of the boundary layer expected to flow past micro-plow 102. Micro-plow 100 can also be taller or shorter. As shown by velocity profile 170, near surface fluid 172 has a much lower velocity than upper boundary layer fluid 174, which is boundary layer air that is a greater distance from surface 102. The velocity of upper boundary layer fluid 174 can be roughly equal to the velocity of freestream fluid 168. After passing over micro-plow 100, the boundary layer velocity profile 170' can be fuller, in that the near surface fluid 172' has a higher velocity than near surface fluid 172. Therefore, the boundary layer at 172' is less likely to separate in an adverse pressure gradient. Furthermore, boundary layer fluid 166 can be thicker after passing over micro-plow 100. The profile thickness is measured by the distance from surface 102 to the upper boundary layer fluid 174. Micro-plow 100 can cause the boundary layer edge near fluid 174' to be spaced further from surface 102 than the boundary layer edge near fluid 174. In one embodiment, micro-plow 100 can energize, or accelerate, near surface fluid 172' by removing energy from, or decelerating, upper boundary layer fluid 174'. The boundary layer, thus, can be thickened in the process.

Figure 5:
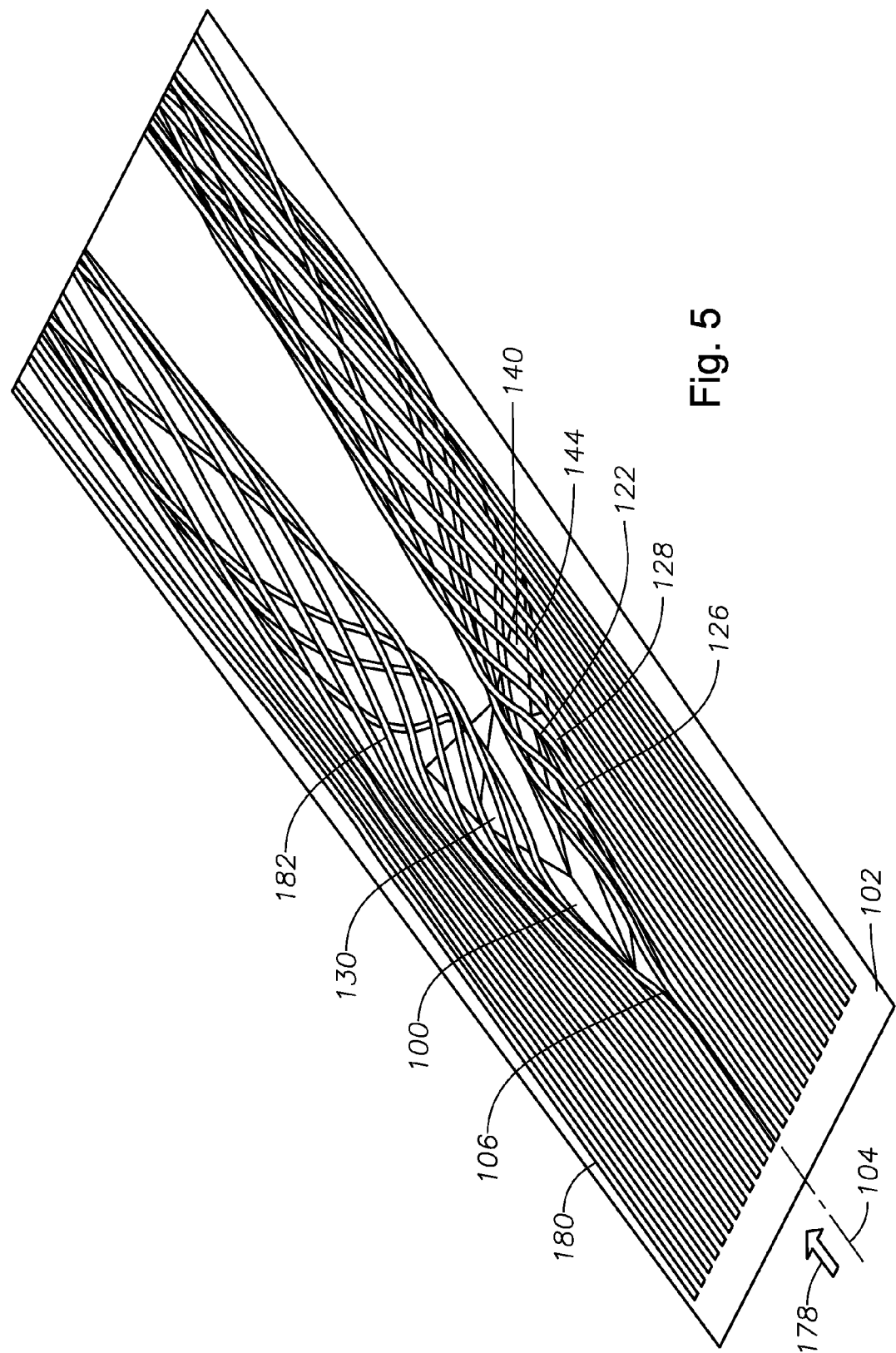
FIG. 5 is a perspective diagrammatic view of a fluid flowing across a micro-plow passive flow control device of FIG. 1.
Figure 6:
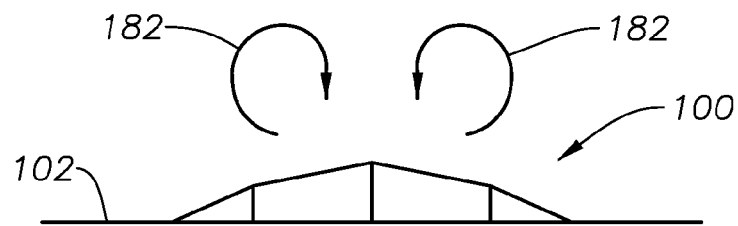
FIG. 6 is a front view of the micro-plow passive flow control device of FIG. 1.

Referring to FIGS. 5 and 6, as fluid 178 moves across surface 102, a portion of fluid 178, including boundary layer fluid 180, encounters micro plow 100. Nose 106 can act to part boundary layer fluid 180 and thus direct a portion of boundary layer fluid 180 along glove sidewall 126 and body sidewall 128. As boundary layer fluid 180 rolls across outer edge 122 and outer leg 144, boundary layer fluid 180 transitions to a rotational flow. As the fluid flows past a portion of dorsal channel 130 and main plows 140, it rotates inward, toward centerline 104, such that the rotational flow develops inwardly rotating vortices 182. Vortices 182 exit micro-plow 100 near surface 102, and the direction of rotation includes favorable downwash which can hold vortices 182 down where they are most effective.

Inwardly rotating vortices 182 generally rotate about an axis that is parallel to centerline 104. Because the inwardly rotating vortices 182 rotate downwardly toward centerline 104, the pair of vortices from each micro plow 100 can urge each other downward toward surface 102 as the rotating vortices extend axially rearward from micro-plow 100. In one embodiment, the flow having rotating vortices 182 remains in close proximity to surface 102, or attached, for a greater distance and greater period of time than it would remain attached if micro-plow 100 did not alter the flow. By emanating rearward from micro-plow 102, vortices 182 can remain primarily in the boundary layer 174 (FIG. 4), rather than drifting up into supersonic core flow 168 (FIG. 4) above surface 102. In one embodiment, nose can part the flow such that shocks remain attached, rather than emanating upward. Nose 106 and glove 118, thus, can reduce shock losses, and dorsal channel 130 can enhance vortices 182.

Figure 7:
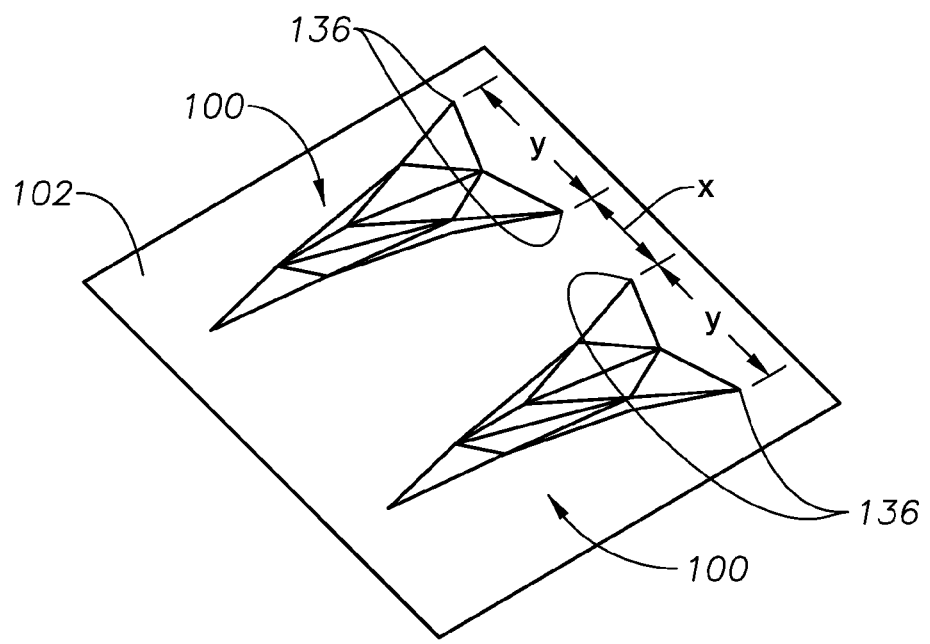
FIG. 7 is a perspective view of a plurality of the micro-plow passive flow control devices of FIG. 1.

Referring to FIG. 7, in one embodiment, a plurality of micro-plows 100 may be located on a surface. They could be placed, for example, side by side and laterally spaced apart from each other. The lateral spacing x between two adjacent micro-plows 100, as measured from outer point 136 to outer point 136', can be less than the width y of a single micro-plow 100, as measured between outer points 136. Any number of micro-plows 100 may be used. Indeed, an array of micro-plows 100 may be spaced apart along the width of surface 102.

Figure 8:
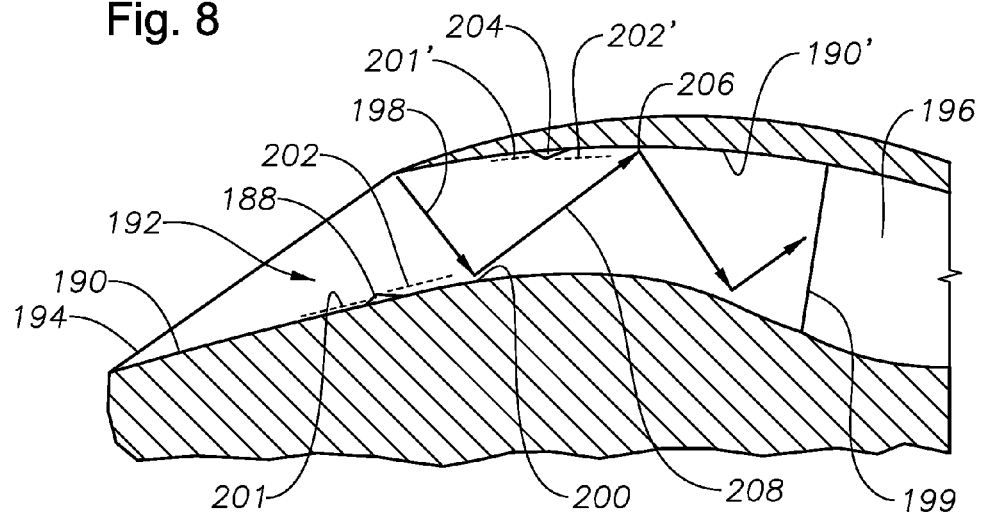
FIG. 8 is a cross-sectional view of an air inlet with a plurality of the micro-plow passive flow devices of FIG. 1.

Referring to FIG. 8, in one embodiment, micro-plows 188 can be located on surface 190 within duct 192. Duct 192 can be, for example, an air inlet on an aircraft, wherein air enters duct inlet 194, passes through duct 192, and subsequently enters subsonic diffuser 196. The air can pass through subsonic diffuser 196 and finally enter a jet engine (not shown). In one embodiment, duct 192 can be part of a supersonic aircraft (not shown). In this embodiment, duct 192 can be a mixed compression inlet which initiates a series of shock waves 198 that reflect off of duct 192 surfaces 190 and ultimately transitions through terminal shock 199 before entering subsonic diffuser 196. Each shock reflection can cause a shock-boundary layer interaction near the point of reflection.

Micro-plows 188 can be located on surface 190 ahead of reflection location 200 wherein oblique shock waves 198 reflect from surface 190. The streamwise, or axial, distance from micro-plow 100 to reflection location 200 can be equal to approximately 10-15 times the height of unmodified boundary layer 201. Unmodified boundary layer 201 can be, for example, the boundary layer upstream of micro-plow 188. Additional sets of micro-plows 204 can be located on another surface 190' within duct 192. The additional micro-plows 204 can be located 10-15 times the boundary layer 201' height in front of contact location 206, wherein another oblique shock 208 contacts surface 190'. In this embodiment, micro plows 188, 204 can be used to redistribute energy within boundary layers 202, the modified boundary layer, such that boundary layers 202 remain attached through the adverse pressure gradient associated with a reflected oblique shock wave 198, 208. In one embodiment, micro-plow 100 can be affixed to surface 190 upstream of a reflection location 200. In this embodiment, when oblique shock 198 is reflected by surface 190, oblique shock 198 encounters boundary layer 202 with little or no shock-induced separation.

Figure 9:
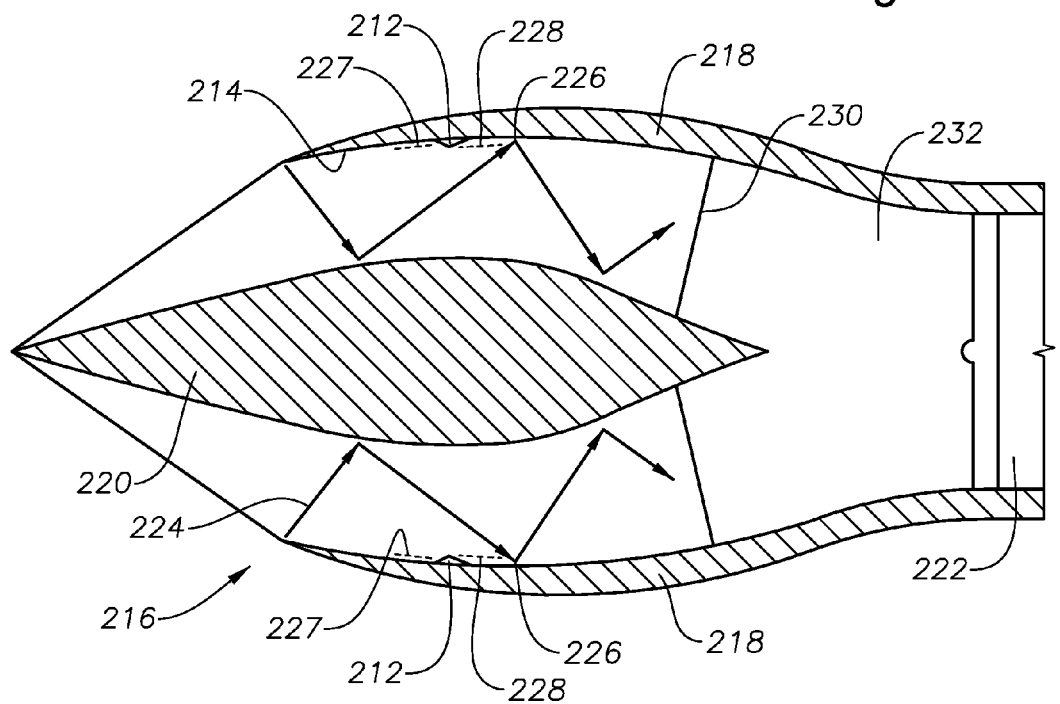
FIG. 9 is a cross-sectional view of another embodiment of an air inlet with a plurality of micro-plow passive flow devices of FIG. 1.

Referring to FIG. 9, in one embodiment, micro-plows 212 can be located on surface 214 within duct 216. Duct 216 can include cowl 218 and centerbody 220. Duct 216 can be used to diffuse and reduce the velocity of a fluid, such as air, before the fluid enters engine 222. In one embodiment, duct 216 can be part of a supersonic aircraft (not shown). In this embodiment, duct 216 can be a mixed compression inlet which initiates a series of shock waves 224 that reflect off of duct 216 surfaces 214. Each shock reflection can cause a shock-boundary layer interaction near the point of reflection.

Micro-plows 212 can be located on surface 214 ahead of reflection location 226 wherein oblique shock waves 224 reflect from surface 214. The streamwise, or axial, distance from micro-plow 212 to reflection location 226 can be equal to approximately 10-15 times the height of unmodified boundary layer 227. In this embodiment, micro plows 212 can be used to redistribute energy within boundary layers 228, the boundary layer modified by micro-plow 212, such that boundary layers 228 remain attached through the adverse pressure gradient associated with a reflected oblique shock wave 224. In one embodiment, micro-plow 212 can be affixed to surface 214 upstream of a reflection location 226. In this embodiment, when oblique shock 224 is reflected by surface 214, oblique shock 224 encounters boundary layer 228 with little or no shock-induced separation. Oblique shocks 224, thus, transition through terminal shock 230 as the now-subsonic fluid passes through subsonic diffuser 232 and subsequently enters engine 222.

We claim:

1. An apparatus for reducing shock-induced separation, the apparatus comprising:
   a micro-plow, the micro-plow having a wedge shape in topview and a centerline, the centerline being parallel to a direction of fluid flow over the micro-plow, the micro-plow comprising:
   a nose segment having a nose and an apex, the apex located aft of the nose, the vertical height of the micro-plow increasing from the nose to the apex, and the vertical height of the micro-plow decreasing from the apex to an aft point, the nose comprising a pair of nose sidewalls located on the nose segment, each nose sidewall diverging from the centerline at a nose-angle;
   a glove segment of the micro-plow, located aft of the apex, the glove segment having glove sidewalls each diverging from the centerline at a glove-angle, the glove angle being greater than the nose-angle;
   a main plow segment of the micro-plow, the main plow segment located aft of the apex, and having a main plow segment width that is greater than a width of the nose segment, wherein the main plow segment comprises a pair of plow segment sidewalls each diverging from the centerline at a plow-angle, the plow-angle being greater than the glove-angle, the plow segment sidewalls each terminating in an aft tip, the aft tips being located further from the centerline than any other portion of the micro-plow; and
   a recess located along the top and spanning between a portion of the glove and a portion of the main plow segment, the vertical height of the recess at the centerline being less than the vertical height of the sidewalls adjacent to the recess.

2. The apparatus according to claim 1, further comprising:
an aft closure point located at the aft most portion of the recess, the aft closure point being centered on the centerline and located forward of the aft tips.

3. The apparatus according to claim 1, wherein the micro-plow further comprises a bottom having a surface area, wherein the surface area of the bottom is larger than a combined surface area of the sidewalls.

4. The apparatus according to claim 1, wherein the micro-plow generates a pair of vortices, each of the vortices rotating in opposite directions about a separate axis, each of the separate axes generally parallel to the centerline, and wherein each of the vortices is rotating toward the surface at a lateral point closest to the centerline and rotating away from the surface at a lateral point furthest from the centerline.

5. The apparatus according to claim 1, wherein the glove segment comprises three pairs of triangular-shaped facets.

6. A method for modifying fluid flow over a surface, the method comprising the steps of:
placing a micro-plow on the surface, the micro-plow having
a wedge shape in topview and a centerline, the centerline being parallel to a direction of fluid flow over the micro-plow,
a nose segment having a nose and an apex, the apex located aft of the nose, the nose comprising a pair of nose sidewalls located on the nose segment, each nose sidewall diverging from the centerline at a nose-angle, the vertical height of the micro-plow increasing from the nose to the apex, and the vertical height of the micro-plow decreasing from the apex to an aft point,
a glove segment of the micro-plow, located aft of the apex, the glove segment having glove sidewalls each diverging from the centerline at a glove-angle, the glove angle being greater than the nose-angle,
a main plow segment of the micro-plow, the main plow segment located aft of the apex, and having a main plow segment width that is greater than a width of the nose segment, wherein the main plow segment comprises a pair of plow segment sidewalls each diverging from the centerline at a plow-angle, the plow-angle being greater than the glove-angle, the plow segment sidewalls each terminating in an aft tip, the aft tips being located further from the centerline than any other portion of the micro-plow,
a recess located along the top and spanning between a portion of the glove and a portion of the main plow segment, the vertical height of the recess at the centerline being less than the vertical height of the sidewalls adjacent to the recess, and
an aft closure point located at the aft most portion of the recess, the aft closure point being centered on the centerline and located forward of the aft points;
flowing a fluid over the micro-plow, the fluid having a boundary layer with a boundary layer height;
parting the fluid with the nose of the micro-plow; and
developing rotational flow with the micro-plow, the rotational flow rotating inward and downward toward the centerline of the micro-plow.

7. The method according to claim 6, further comprising the step of keeping the rotational flow attached to the surface for a distance that is approximately ten times the height of the boundary layer.

8. The method according to claim 6, further comprising determining a location where an oblique shock will contact the surface and placing the micro-plow on the surface such that the oblique shock intersects the rotational flow at a point where the rotational flow is still attached to the surface.

9. The apparatus according to claim 6, wherein the height of the apex is approximately ⅓ the boundary layer height.

10. The method according to claim 8, wherein the streamwise distance from the micro-plow to the location where the oblique shock contacts the surface is approximately 10-15 times the height of the boundary layer.

11. The method according to claim 6, wherein a second oblique shock is directed toward a second surface, and further comprising placing a second micro-plow on the second surface, and generating a second rotational flow with the second micro-plow, such that the oblique shock intersects a second rotational flow.

12. The method according to claim 6, wherein the rotational flow comprises two rotating vortices, the two rotating vortices each rotating about a separate axis, each axis being generally parallel to the centerline.

13. The method according to claim 12, wherein each of the two rotating vortices develop a downwash that delays vortex lift-off by urging the other of the two rotating downwashes toward the surface.

14. The method according to claim 6, further comprising placing a plurality of laterally adjacent micro-plows on the surface.

15. A supersonic aircraft powered by a jet engine, comprising:
a mixed compression air inlet to the jet engine;
an interior surface located within the mixed compression air inlet, wherein an oblique shock develops and is reflected by the interior surface;
a micro-plow located on the interior surface, the micro-plow having a centerline, the centerline being parallel to a direction of fluid flow over the micro-plow wherein a fluid having a boundary layer is flowing across the interior surface in a direction parallel to the centerline, the micro-plow comprising:
a nose segment having a point and an apex, the apex located aft of the point, the vertical height of the apex being higher than any other portion of the micro-plow, the nose segment having a pair of nose sidewalls each diverging from the centerline at a nose-angle;
a glove segment, the glove segment having glove sidewalls each diverging from the centerline at a glove-angle, the glove angle being greater than the nose-angle;
a main plow segment, the main plow segment having a pair of plow segment sidewalls each diverging from the centerline at a plow-angle, the plow-angle being greater than the glove-angle, the plow segment sidewalls each terminating in an aft tip, the aft tips being located further from the centerline than any other portion of the micro-plow;
a recess located along the top and spanning between a portion of the glove and a portion of the main plow segment, the vertical height of the recess at the centerline being less than the vertical height of the sidewalls adjacent to the recess;
an aft closure point located at the aft most portion of the recess, the aft closure point being centered on the centerline and located forward of the aft tips; and
a bottom, wherein a surface area of the bottom is larger than a combined surface area of the sidewalls; and
wherein the micro-plow is affixed to the interior surface upstream of a reflection point on the surface wherein an oblique shock is reflected by the surface, and wherein the oblique shock does not induce separation when it encounters the boundary layer.

16. The apparatus according to claim 15, wherein the micro-plow generates a pair of vortices, each of the vortices rotating in opposite directions about a separate axis, each of the separate axes generally parallel to the centerline, and wherein each of the vortices is rotating toward the surface at a lateral point closest to the centerline and rotating away from the surface at a lateral point furthest from the centerline.

17. The apparatus according to claim 15, wherein the distance from the micro-plow to the reflection point equals approximately 10-15 times the height of the boundary layer.

18. The apparatus according to claim 15, wherein the height of the apex is approximately ⅓ the height of the boundary layer.

19. The apparatus according to claim 15, wherein the micro-plow is affixed to the surface upstream of a reflection point on the surface wherein an oblique shock is reflected by the surface, and wherein the oblique shock does not induce separation when it encounters the boundary layer.

20. The apparatus according to claim 15 comprising a second micro-plow laterally apart from the first mentioned micro-plow, wherein the space between one of the aft tips of the first mentioned micro-plow and one of the aft tips of the second micro-plow is less than the distance between the aft tips of the first mentioned micro-plow.

* * * * *